Figure 2:
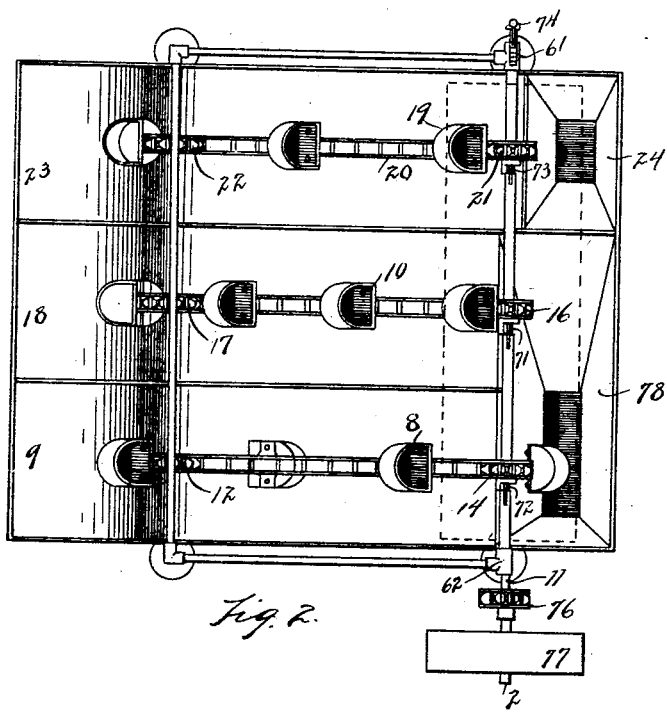

No. 710,760. Patented Oct. 7, 1902.
T. W. CONNOLLY.
CEMENT MIXING MACHINE.
(Application filed Sept. 30, 1901.)
(No Model.) 3 Sheets—Sheet 1.

WITNESSES
Chas. E. Wiener
Lotta L. Hayton.

INVENTOR
Thomas W. Connolly
By Parker & Burton
Attorneys.

THE NORRIS PETERS CO., PHOTO-LITHO., WASHINGTON, D. C.

No. 710,760. Patented Oct. 7, 1902.
T. W. CONNOLLY.
CEMENT MIXING MACHINE.
(Application filed Sept. 30, 1901.)
(No Model.) 3 Sheets—Sheet 2.

WITNESSES
Chas. E. Wisner.
Lotta L. Hayton.

INVENTOR
Thomas W. Connolly
By Parker & Burton
Attorneys.

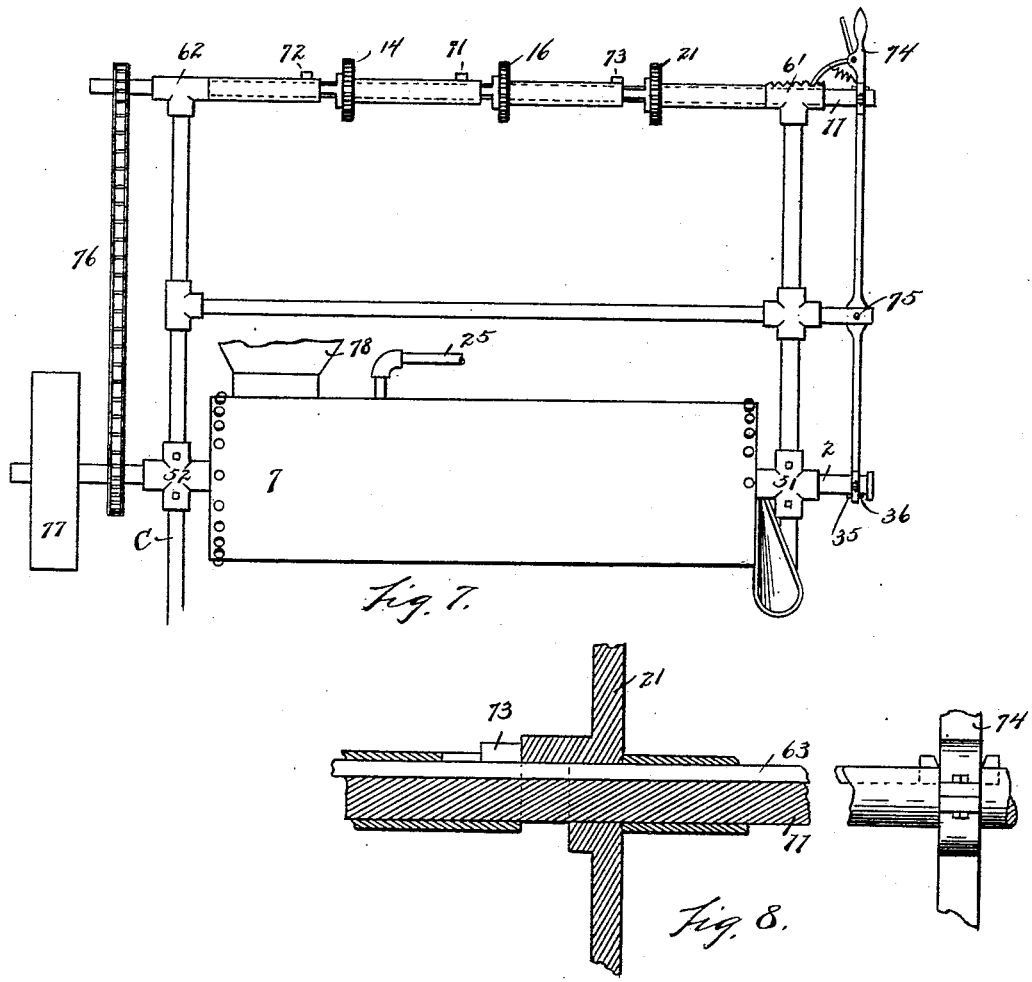

UNITED STATES PATENT OFFICE.

THOMAS W. CONNOLLY, OF DETROIT, MICHIGAN.

CEMENT-MIXING MACHINE.

SPECIFICATION forming part of Letters Patent No. 710,760, dated October 7, 1902.

Application filed September 30, 1901. Serial No. 77,006. (No model.)

*To all whom it may concern:*

Be it known that I, THOMAS W. CONNOLLY, a subject of the King of Great Britain, residing at Detroit, county of Wayne, State of Michigan, have invented a certain new and useful Improvement in Cement-Mixing Machines; and I declare the following to be a full, clear, and exact description of the invention, such as will enable others skilled in the art to which it pertains to make and use the same, reference being had to the accompanying drawings, which form a part of this specification.

This invention relates to cement-mixers, and has for its object an improved machine to be used for making or producing cement mixtures, concrete, mortar, or pavement compounds, in which the material is treated continuously and in which the ingredients are in measured quantities, thoroughly mixed, the dry constituents being thoroughly mixed before the mingling therewith of the liquid constituent, and the mixing is continued after the addition of the liquid constituent.

In working the machine to produce the cement mixture or mortar or concrete the dry materials are introduced by continuously running the elevator-buckets, which convey from a receptacle the dry constituent portions of the mixture, and the buckets are so disposed on the elevator-chains by which they are carried that the dry constituents are properly proportioned. The constituents are emptied from the buckets into the mixing-chamber, where they are thoroughly commingled by arms on a revolving shaft, and the shaft is belted to the shaft which actuates the elevator-chains, so that its rotation and the consequent mixture of the material accords with the feeding part of the machine. As the dry constituents are commingled they are pushed forward in the mixing-chamber and reach the zone where the liquid constituents are admitted into the chamber, and the mixing is continued after the introduction of the liquid constituents, the material at all times traveling forward to the place of delivery. The mixing-blades are thin and wide and are arranged with their stems projecting through a hollow driving-shaft, and provision is made to turn each plate on its axis, so that the angle at which it enters or passes through the mixture may be regulated and the speed at which the mixture travels forward in the mixing-chamber correspondingly regulated, and provision is made to keep the apparatus out of action, if desired, or to throw some part of it out of action while retaining some parts in action, so that the amount of mixing given to the material may be regulated at will.

The results herein outlined are accomplished by the machine shown in the drawings and described in the following specification.

Figure 7:
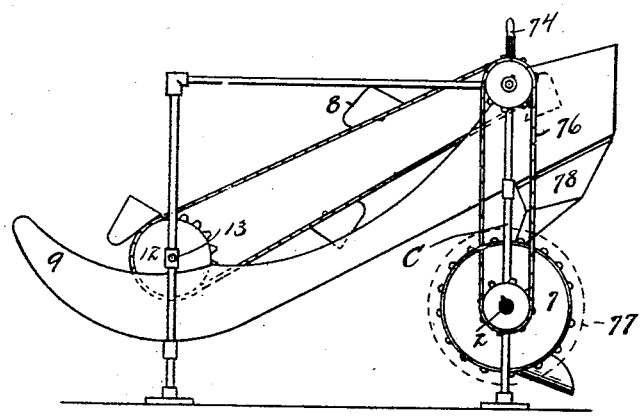
Figure 3:
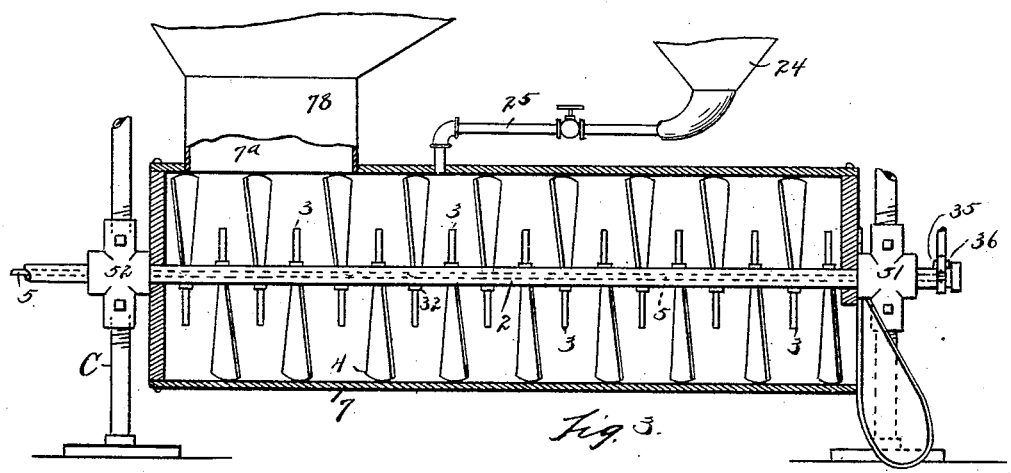
Figure 4:
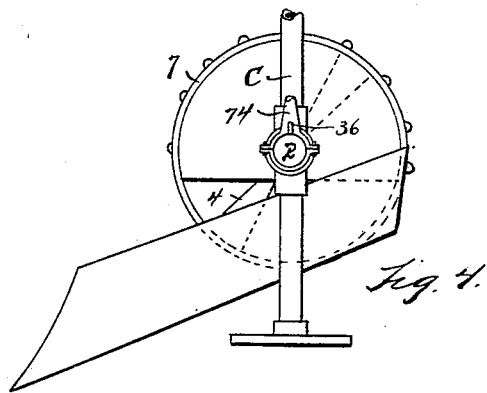
Figure 5:
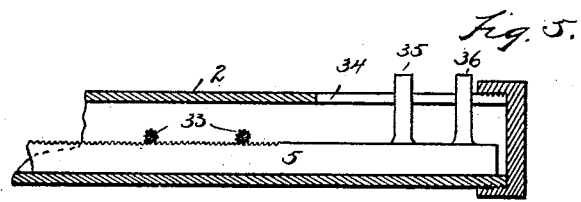
Figure 6:
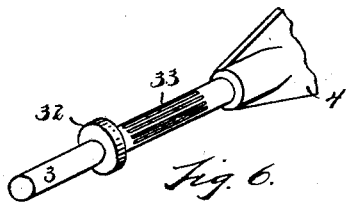

In the drawings, Figure 1 is a side elevation of the machine, showing the elevating-buckets and an end view of the mixing-barrel. Fig. 2 is a plan view. Fig. 3 is a section longitudinally of the mixing-barrel. Fig. 4 is an end view of the mixing-barrel and shows the connection of the pitch-regulator with the shaft. Fig. 5 is a longitudinal section of the driving-shaft of the mixer. Fig. 6 is a perspective of the stem of the mixing-blade. Fig. 7 is an elevation of the shaft of the sprocket-wheels by which the elevators are driven. Fig. 8 is an enlarged detail of a portion of the elevator-driving shaft.

A cylindrical mixing barrel or chamber 7 has a hollow shaft 2 journaled centrally in its head-closures. The shaft projects at each end and is supported in bearings on the main framework C. The shaft 2 is provided with transverse holes, through which are inserted the stems 3 of mixing-blades, and the mixing-blades are secured to the shaft after being inserted therethrough by collars 32. The stem of each mixing-blade is provided at that part which lies within the hollow of the shaft 2 with gear-teeth 33, and each mixing-blade has a wide terminal 4 at one end. The holes through the shaft are arranged parallel and do not wind in a spiral, and the several blades after being assembled project in what may be considered as a common plane rather than in a spiral position, one half the blades projecting at one side of the shaft and the other half projecting at the other side of the shaft. After the blades have been inserted in place and secured by the collars from escaping from the shaft a long rack-bar is pushed in from the end and engages as a rack with the teeth on the several stems, and when this assembling is taking place care is taken to so arrange each blade before the rack-bar engages with it that the wide parts of the blade will all have the same pitch when the bar has finally been pushed entirely through and has come into engagement with all of the pinions, and it is then properly located with respect to the shaft of the elevator-pinions hereinafter mentioned. When in proper position, the end of the rack-bar 5 will have entered entirely within the end of the hollow shaft 2, and there will be projecting from the shaft 2 through a slot 34 in the shaft 2 a pair of lugs 35 and 36.

There is in the frame of the machine, above the bearings 51 and 52, other bearings 61 and 62, in which there is mounted a shaft 11, and on the shaft 11 are sprocket-wheels 14, 16, and 21. Each of the sprocket-wheels is held by a spacing-sleeve from shifting its position, but is free to rotate on the shaft 11 when not clutched thereto by devices to be described. The shaft 11 is grooved longitudinally and is provided with a spline-like rod or bar 63, which passes through the bearings 61 and 62 under the surface, through the hubs of the sprocket-wheels 14, 16, and 21, and is provided with a lug at each sprocket-wheel, which may be drawn into engagement behind a corresponding lug on the hub of each wheel, and when in such engagement the sprocket-wheel will be forced to rotate with the shaft. The several hubs or projections on the hub are of different length, and the lugs on the spline are spaced from the sprocket-wheels to bring the sprocket-wheels into rotative engagement with the shaft successively and not all at the same time. Thus if the spline be shifted to the right, as shown in Fig. 7, the lug 73 will engage the hub of wheel 21 and cause the wheel 21 to rotate with the shaft before the lug 72 engages the hub of the wheel 14, and the lug 72 will come into engagement with the hub of the wheel 14 before the lug 71 comes into engagement with the hub of the wheel 16, and the disengagement will be in the reverse order. These parts are brought into engagement and disengagement by means of a hand-lever 74, pivoted to the main frame at pivot 75, and the hand-lever straddles the shaft 2 and engages between the projecting lugs 35 and 36 on the bar 5, and the shifting of the spline, and consequent engagement or disengagement of the elevator sprocket-wheels with their driving-shaft, is accompanied by a variation in the pitch of the mixing-blades, so that if it be desired to do continuous mixing without rapid advance of the material and at the same time to suspend the introduction of some of the constituents of the cement into the mixing-chamber that result may be accomplished by the use of the hand-lever 74.

The shaft 11 is driven by a sprocket-chain 76 from the main shaft 2 of the mixer, and the main shaft 2 is driven by a belt-wheel 77 from any convenient source of power.

Under each elevator is a receptacle, the bottom part of which is a trough-like receptacle, from which the floor extends up under the chain to receive any material that may drop from the rising bucket. The elevator-chains pass over sustaining sprocket-wheels 12, 17, and 22 on a shaft 13, and the buckets dip into the troughs 9, 18, and 23, each bucket taking from its appropriate trough a quantity of constituent material, and each bucket delivering at the summit of its travel into a proper hopper that discharges into the mixing-chamber. The buckets 8 and 10 dipping into troughs 9 and 18 are intended to be used to lift the solid constituents which are dumped into the hopper 78 and directed into the mixing-chamber through the opening 7ª. The buckets 19 on the chain 20 are intended to elevate the liquid constituents of the cement and dump the liquid into the funnel-like hopper 24, from which this constituent is conveyed through pipe 25 into the mixing-chamber.

What I claim is—

1. In a cement-mixer, the combination of a plurality of elevators, a mixing-barrel, mixing-blades, rotatably mounted in said mixing-barrel, and intended to both mix and impel the material therein, and means for adjusting simultaneously all of said mixing-blades, substantially as described.

2. In a cement-mixing machine, in combination with a mixing-barrel, with rotative mixing-arms therein, a plurality of elevator chains and buckets therein, a single means of driving all of said elevator-chains, means for disengaging the driving mechanism, and any one of said chains and means for conveying the elevated material into the mixing-barrel, substantially as described.

3. In a cement-mixing machine, in combination with elevator-buckets adapted to raise the solid constituents of the cement elevator-buckets adapted to raise and deliver the liquid constituents of the cement, means for disengaging either bucket-chain from its driving mechanism, a mixing-barrel provided with mixing-arms arranged to mix the solid constituents before the liquid constituent is added thereto, substantially as described.

4. In a cement-mixing machine, in combination with elevator-buckets adapted to raise the solid constituents of the cement elevator-buckets adapted to raise and deliver the liquid constituents of the cement, means for disengaging either bucket-chain from its driving mechanism, a mixing-barrel, provided with mixing-arms arranged to mix the solid constituents before the liquid constituent is added thereto, and afterward to mix the entire constituents, substantially as described.

5. In a cement-mixer, the combination of a fixed barrel, a rotatable shaft thereon, adjustable blades mounted on said shaft and means for adjusting all the blades simultaneous and equally, substantially as described.

6. In a cement-mixer, in combination with a mixing-barrel, a hollow shaft arranged to rotate therein, mixing-blades engaging through said shaft and provided within the hollow of the shaft with means for attachment to an adjusting-bar, an adjusting-bar extending longitudinal of said shaft, engaging said blades and adapted to adjust them simultaneously, substantially as described.

In testimony whereof I sign this specification in the presence of two witnesses.

THOMAS. W. CONNOLLY.

Witnesses:
CHARLES F. BURTON,
MAY E. KOTT.